United States Patent
Hönl et al.

(10) Patent No.: US 6,840,474 B2
(45) Date of Patent: Jan. 11, 2005

(54) BELT RETRACTOR

(75) Inventors: Wolf-Dieter Hönl, Böbingen (DE); Thomas Modinger, Alfdorf (DE)

(73) Assignee: TRW Occupant Restraint Systems GmbH & Co. KG, Alfdorf (DE)

(*) Notice: Subject to any disclaimer, the term of this patent is extended or adjusted under 35 U.S.C. 154(b) by 0 days.

(21) Appl. No.: 10/245,002

(22) Filed: Sep. 17, 2002

(65) Prior Publication Data

US 2003/0052209 A1 Mar. 20, 2003

(30) Foreign Application Priority Data

Sep. 17, 2001 (DE) .................. 201 15 316 U

(51) Int. Cl.[7] .................. B65H 75/48; B60R 22/34
(52) U.S. Cl. .................. 242/374; 242/394; 242/390.8; 280/807; 297/476
(58) Field of Search .................. 242/374, 394, 242/340.8, 340.9; 280/807; 297/476

(56) References Cited

U.S. PATENT DOCUMENTS

| 4,455,000 A | * | 6/1984 | Nilsson ............ 242/374 |
| 4,478,433 A | * | 10/1984 | Taguchi et al. ...... 280/807 |
| 4,907,820 A | * | 3/1990 | Fohl ............... 280/806 |
| 6,105,893 A | * | 8/2000 | Schmidt et al. ...... 242/374 |
| 6,447,012 B2 | * | 9/2002 | Peter et al. ......... 280/806 |
| 2001/0045483 A1 | * | 11/2001 | Tanaka et al. ...... 242/390.9 |
| 2002/0017584 A1 | * | 2/2002 | Specht ............. 242/390.9 |

FOREIGN PATENT DOCUMENTS

| DE | 2220669 | | 11/1973 |
| DE | 3019298 | A1 | 11/1981 |
| DE | 3338187 | | 5/1985 |
| DE | 19520721 | A1 | 12/1997 |
| DE | 19731689 | C2 | 7/1999 |
| DE | 19954878 | A1 | 6/2000 |
| DE | 19905703 | C1 | 9/2000 |
| DE | 19927731 | A1 | 12/2000 |
| WO | 99/62747 | | 12/1999 |

* cited by examiner

Primary Examiner—Kathy Matecki
Assistant Examiner—Sang Kim
(74) Attorney, Agent, or Firm—Tarolli, Sundheim, Covell & Tummino L.L.P.

(57) ABSTRACT

A belt retractor for a vehicle safety belt comprises a frame, a belt reel rotatably mounted in the frame, a belt reel axle with an external toothing, and a pawl. The belt retractor has a sliding clutch by means of which the pawl can be brought to engage in the external toothing, in order to rotate the belt reel.

8 Claims, 4 Drawing Sheets

BELT RETRACTOR

TECHNICAL FIELD

This invention relates to a belt retractor for a vehicle safety belt.

BACKGROUND OF THE INVENTION

A conventional belt retractor comprises a frame, a belt reel rotatably mounted in the frame, a belt reel axle with an external toothing, and a pawl. Modern belt retractors are often equipped with additional functions beside the usual belt-webbing-sensitive and/or vehicle-sensitive locking functions. One of these additional functions is the precautionary tensioning of the belt webbing in a critical situation, e.g. at full braking. In modern systems, tensioning a belt webbing in the case of an impending vehicle impact can be effected by an electric motor, in particular a servomotor. When using a powerful electric motor drive, a belt slack possibly existing can already be removed with such pretensioning prior to an accident, in order to minimize the risk of injuries for the occupants. Moreover, the functioning of a belt tensioner can be improved as compared to a conventional system.

It is the object underlying the invention to provide a belt retractor in which the use of an electric motor provides for a fast and reliable tensioning of the belt.

BRIEF SUMMARY OF THE INVENTION

According to the invention, a belt retractor for a vehicle safety belt comprises a frame, a belt reel rotatably mounted in the frame, a belt reel axle with an external toothing, and a pawl. The belt retractor has a sliding clutch by means of which the pawl can be brought to engage in the external toothing, in order to rotate the belt reel. Even when the belt retractor is connected to comparatively slow drive systems, the sliding clutch provides for an engagement of the pawls in the external toothing. In this connection, the term "sliding clutch" refers to a connection which is different from the actual coupling between the external toothing and the pawl.

In a preferred embodiment, the frame has a stop member, and the sliding clutch has a wheel and a clutch disc with a plurality of tooth elements, and one of the tooth elements can cooperate with the stop member such that a relative rotation between the clutch disc and the wheel can be effected. The wheel including the tooth elements, and the stop member constitute particularly simple components, which allow to directly engage the pawl in the external toothing.

It is particularly advantageous if the pawl is mounted in the wheel and, due to the relative rotation between the clutch disc and the wheel, can be brought to engage in the external toothing, in order to rotate the belt reel. In contrast to clutches in which a pawl is brought to engage due to a centrifugal force, it is achieved here that even with a comparatively slow rotation of the wheel the pawl is quickly brought to engage in the external toothing of the belt reel axle via the clutch disc. Moreover, engaging the pawl in the external toothing is reversible, and the disengagement of the pawl can be achieved by turning the wheel back.

In one embodiment, the wheel is coupled with a motor, advantageously with an electric motor, which can then ensure the tensioning of the belt webbing in the case of an impending vehicle impact.

In another embodiment, the wheel is directly coupled with the motor, which provides for relatively high rotational speeds of the wheel.

In another, particularly preferred embodiment, the wheel is coupled with the motor via a belt, whereby less powerful motors can also be used.

It is particularly advantageous when the wheel is a gearwheel, as in this case a particularly good power transmission between motor and wheel can be achieved.

DETAILED DESCRIPTION OF THE PREFERRED EMBODIMENT

Figure 1:
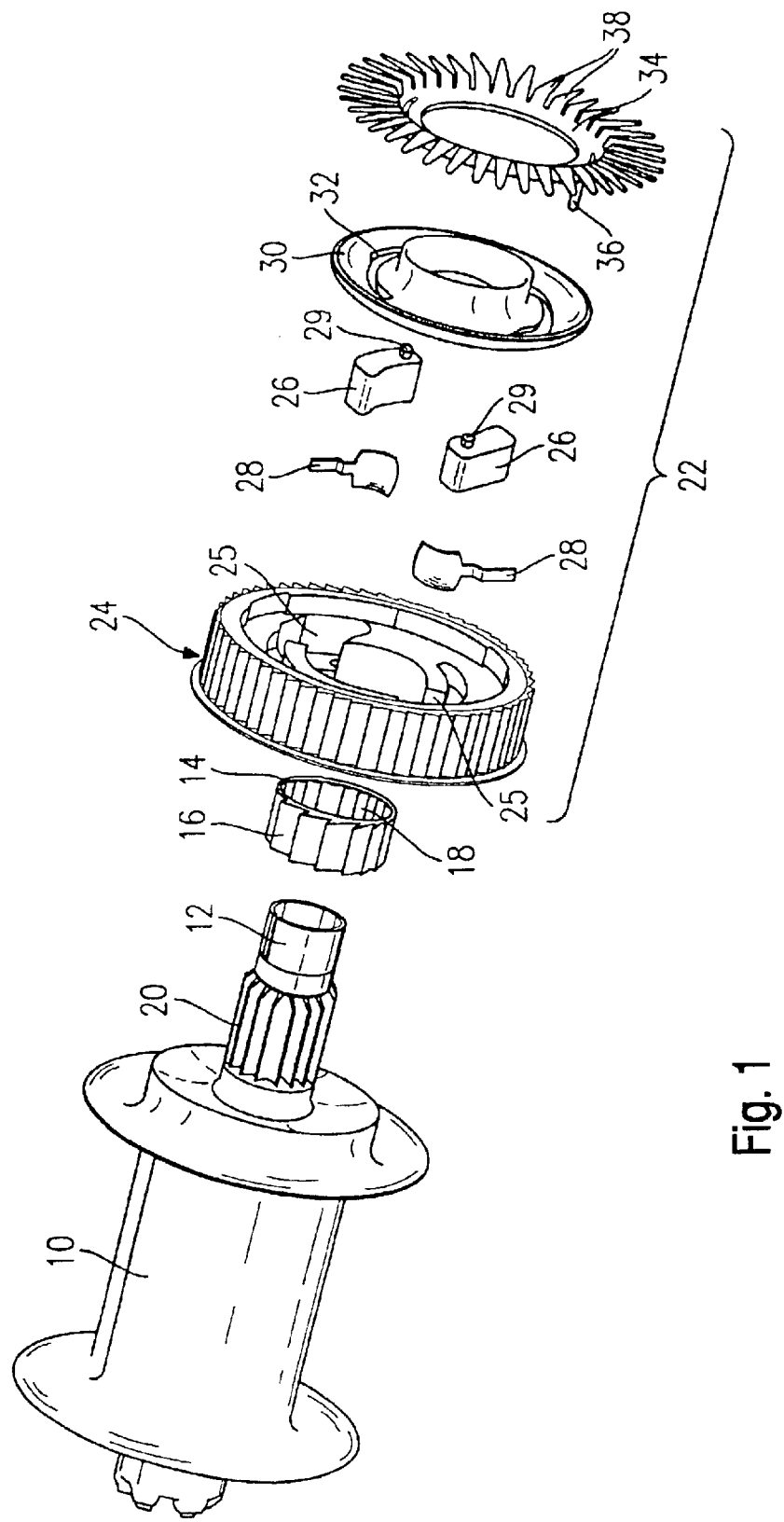
FIG. 1 shows an exploded view of the belt retractor.

The exploded view of FIG. 1 shows a belt retractor for a vehicle safety belt, comprising a belt reel 10, a belt reel axle 12, an annular gear 14 with an external toothing 16 and an internal toothing 18, which together with a belt reel axle toothing 20 provides for a non-rotatable connection of the annular gear with the belt reel axle. This design on the one hand provides for a particularly safe positioning of the annular gear 14, but on the other hand also provides for the easy exchange of the annular gear when the external toothing 16 is worn. The belt retractor furthermore has a sliding clutch 22, which comprises a wheel 24 with pockets 25. In the pockets, pawls 26 with return springs 28 are inserted. Each pawl is pivotally mounted by means of a pawl axle 29. The sliding clutch 22 is sealed with a cover 30, which has apertures 32. A clutch disc 34 is rotatably hung into the cover 30 by means of bayonet joints (not shown) and connected with the pawls 26 via connecting elements 36. The clutch disc 34 has flexible tooth elements 38 across its entire external periphery. The wheel 24 is directly connected to an electric motor 110 (schematically shown).

Figure 2:
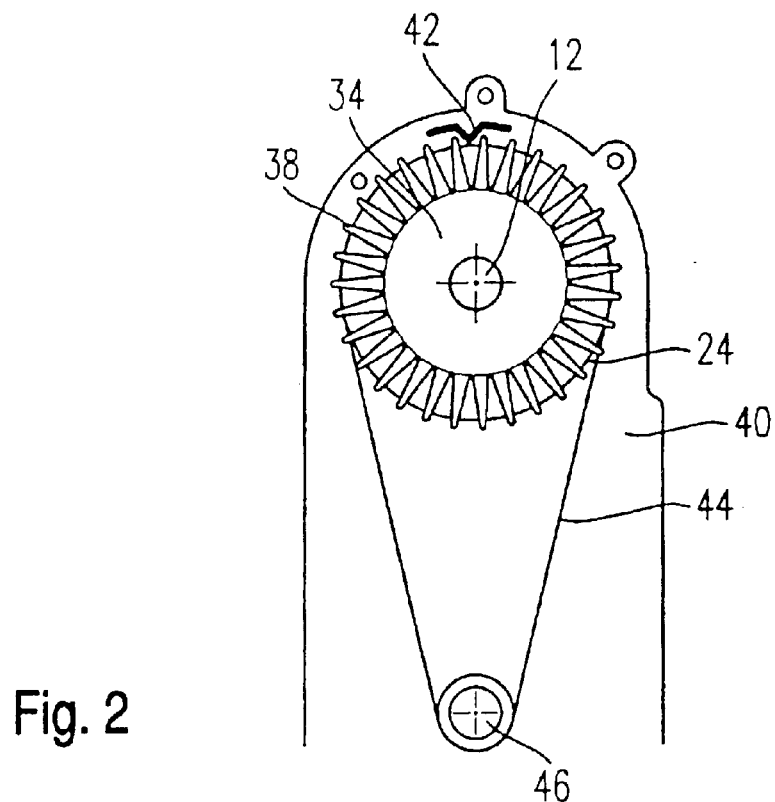
FIG. 2 shows a side view of the belt retractor with drive system.

FIG. 2 represents a side view of the belt retractor. The belt retractor has a frame 40 with a stop member 42, which is positioned such that the tooth elements 38 of the clutch disc 34 can cooperate with the stop member. The wheel 24 is connected with the motor axle 46 of an electric motor 100 schemitically shown) through a belt 44, whereby an optimum power transmission from the motor axle 46 to the wheel can be effected.

FIGS. 3a to 3d represent the belt retractor in a side view in various operating positions.

With reference to FIGS. 3a to 3d, the operation of the belt retractor will be explained in the following.

In the starting position (FIG. 3a), the pawls 26 are retained by the return springs 28 such that they are not in engagement with the external toothing 16 of the annular gear 14. In this case, the belt reel 10 can rotate freely (FIG. 1) and belt webbing can be withdrawn from the belt reel.

Figure 3A:
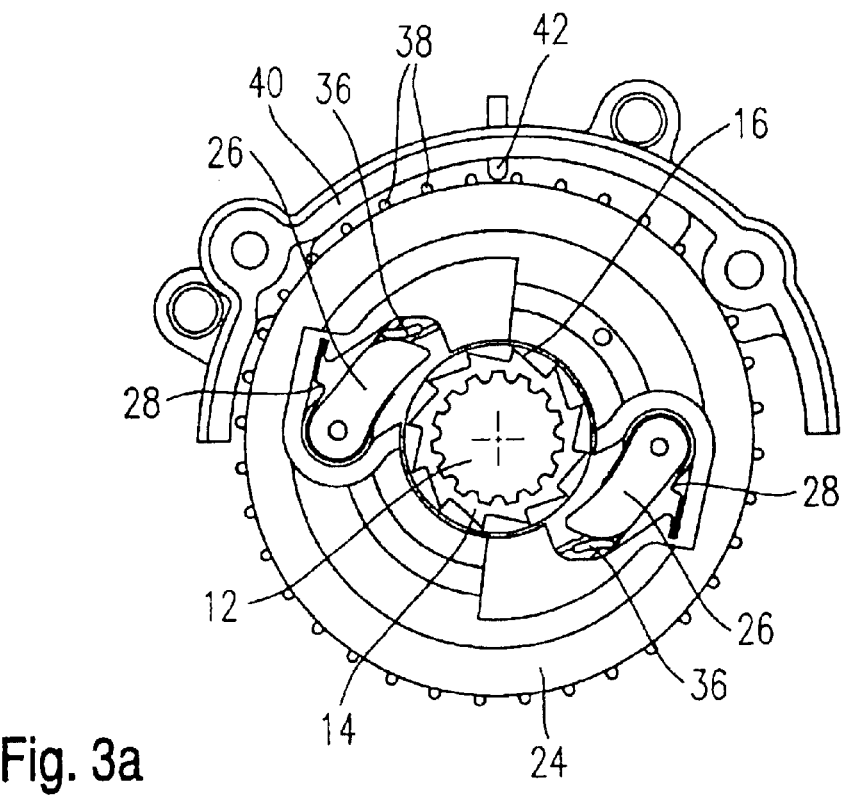
FIGS. 3a to 3d show the belt retractor in a partly sectional side view in a starting position (3a), a first intermediate position (3b), a second intermediate position (3c) and an end position (3d).
Figure 3B:
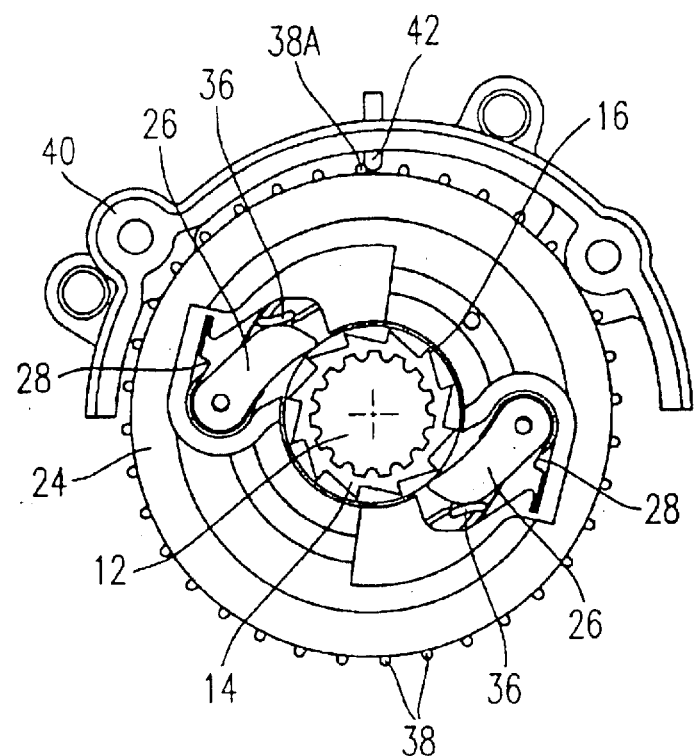

When the motor starts, the wheel 24 is rotated in clockwise direction with respect to FIGS. 3a to 3d by means of the belt 44 (see also FIG. 2). The clutch disc 34, which is entrained by the connecting elements 36 and therefore also rotates at the beginning, reaches the stop member 42 with one of the tooth elements 38A already upon passing through a small angle of rotation. The movement of the clutch disc is stopped thereby, which results in a relative movement between the wheel 24 and the clutch disc 34. This leads to the fact that the pawls 26 are swiveled out of their rest position by means of the connecting elements 36 of the clutch disc (FIG. 3b).

Figure 3C:
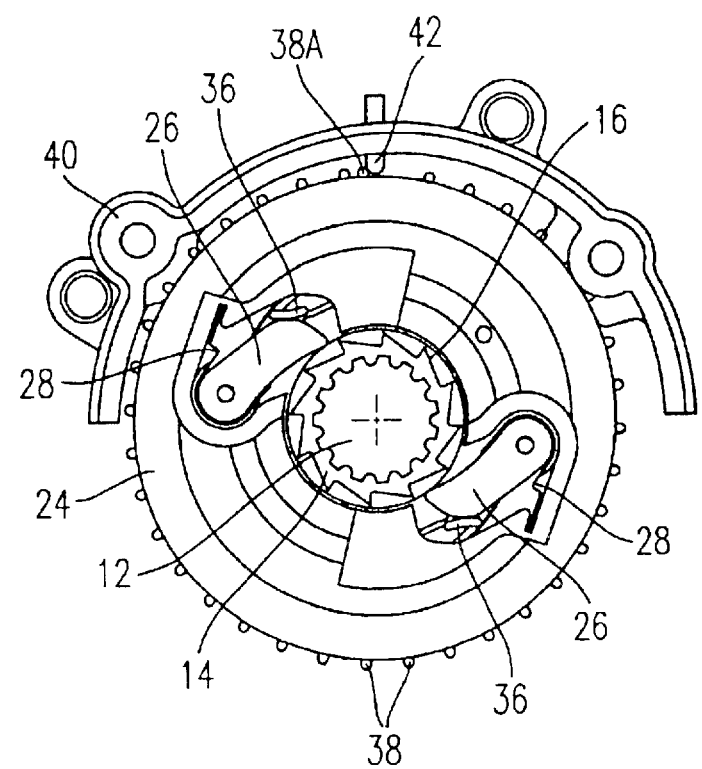

When the wheel 24 continues to be rotated by the motor, the clutch disc 34 is still stopped by the contact of the tooth element 38A with the housing-fixed stop member 42, the flexible tooth element 38A bending more and more (FIG. 3c). The pawls 26 are swiveled towards the annular gear 14 by means of the connecting elements 36 of the clutch disc 34.

Figure 3D:
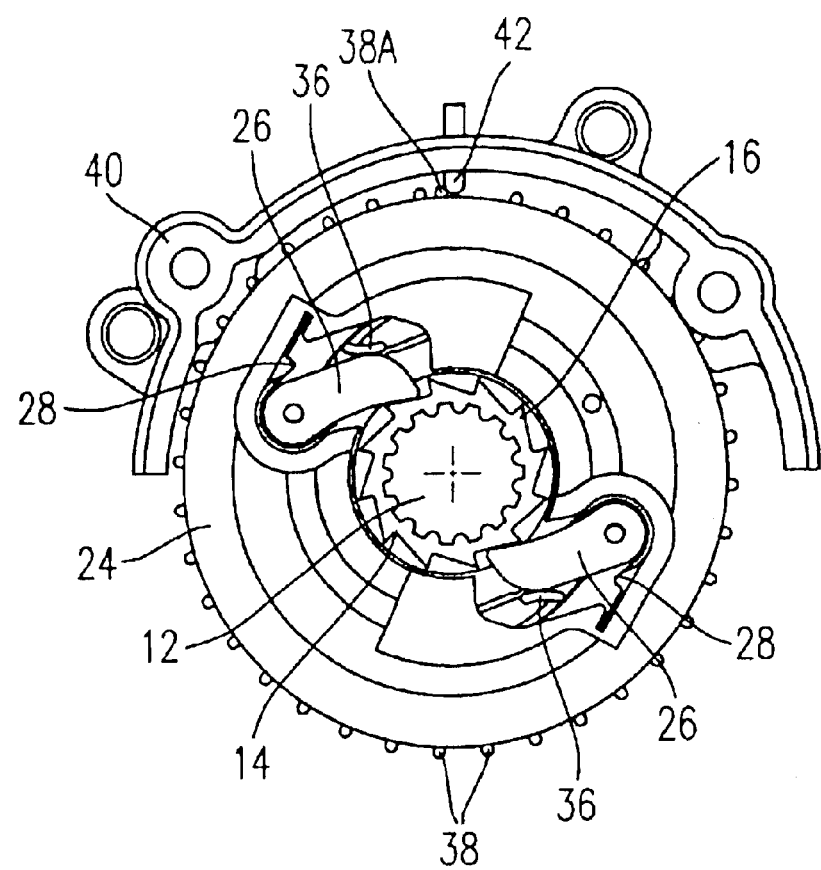

When the motor has rotated the wheel 24 by about 20° with respect to the starting position, the two pawls 26 have been swiveled against the force of the return springs 28 to such an extent that they come in engagement with the annular gear 14 (FIG. 3d). Now, the flexible tooth element 38A has also reached a position in which it can overcome the stop member 42. In the case of a further rotation of the wheel 24, the clutch disc 34 is now again running in synchronism with the wheel 24, and the flexible tooth elements 38 are pulled over the housing-fixed stop member.

For releasing the sliding clutch 22, the wheel 24 must be rotated in counterclockwise direction with respect to FIGS. 3a to 3d by means of the motor; the clutch disc 34 lags with respect to the wheel, and the connecting elements 36 are guided such that the pawls 26 again reach their starting position by means of the return springs 28.

What is claimed is:

1. A belt retractor for a vehicle safety belt, said belt retractor comprising a frame with a stop member, a belt reel rotatably mounted in said frame, a belt reel axle, an annular gear with an external toothing, and a pawl, said belt retractor having a sliding clutch comprising a wheel and a clutch disc with a plurality of tooth element one of said tooth elements cooperating with said stop member to cause a relative rotation between said clutch disc and said wheel and to cause engagement of said pawl in said external toothing in order to rotate said belt reel, and said sliding clutch enabling disengagement of said pawl from said external toothing by a return spring tensioned in a direction to urge said pawl to disengage from said external toothing.

2. The belt retractor as claimed in claim 1, wherein said pawl is mounted in said wheel and can be brought to engage in said external toothing by said relative rotation between said clutch disc and said wheel, in order to rotate said belt reel.

3. The belt retractor as claimed in claim 2, wherein said wheel is coupled with a motor.

4. The belt retractor as claimed in claim 3, wherein said motor is an electric motor.

5. The belt retractor as claimed in claim 2, wherein said wheel is directly coupled with said motor.

6. The belt retractor as claimed in claim 1, wherein said wheel is coupled with said electric motor via a belt.

7. The belt retractor as claimed in claim 1, wherein said wheel is a gearwheel.

8. The belt retractor as claimed in claim 1, wherein said belt reel axle is non-rotatably connected with said annular gear.

* * * * *